(12) United States Patent
Teranishi

(10) Patent No.: US 10,769,144 B2
(45) Date of Patent: Sep. 8, 2020

(54) DATABASE SEARCH SYSTEM, DATABASE SEARCH METHOD, AND NON-TRANSITORY RECORDING MEDIUM

(71) Applicant: NEC Corporation, Tokyo (JP)

(72) Inventor: Isamu Teranishi, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 180 days.

(21) Appl. No.: 15/319,233

(22) PCT Filed: Jun. 5, 2015

(86) PCT No.: PCT/JP2015/002841
§ 371 (c)(1),
(2) Date: Dec. 15, 2016

(87) PCT Pub. No.: WO2015/194117
PCT Pub. Date: Dec. 23, 2015

(65) Prior Publication Data
US 2017/0132279 A1    May 11, 2017

(30) Foreign Application Priority Data
Jun. 16, 2014  (JP) .................................. 2014-122962

(51) Int. Cl.
*G06F 16/24* (2019.01)
*G06F 16/2453* (2019.01)
(Continued)

(52) U.S. Cl.
CPC ...... *G06F 16/2453* (2019.01); *G06F 12/0246* (2013.01); *G06F 16/90335* (2019.01);
(Continued)

(58) Field of Classification Search
CPC ........... G06F 17/30442; G06F 21/6218; G06F 12/0246; G06F 16/2453; G06F 16/90335; G07F 17/30979
See application file for complete search history.

(56) References Cited

U.S. PATENT DOCUMENTS 8,938,068 B2 *  1/2015  Kobayashi ............ H04L 9/3073
380/28
10,127,391 B1 *  11/2018  Whitmer ............. G06F 16/2228
(Continued)

FOREIGN PATENT DOCUMENTS

JP      H09-231231 A    9/1997
JP      2005-038024 A   2/2005
(Continued)

OTHER PUBLICATIONS

Kengo Mori, "Fukugo sezu ni Shori Suru Angoka Kankei Database (Operating Encrypted Relational Database without Decryption)", SCIS 2014, The 31$^{st}$ Symposium on Cryptography and Information Security Symposium SCIS 2014, [CD-ROM], 2014 Nen Symposium on Cryptography and Information Security Symposium Gaiyoshu, Jan. 24, 2014, pp. 1 to 8.
(Continued)

*Primary Examiner* — Alicia M Willoughby
(74) *Attorney, Agent, or Firm* — Sughrue Mion, PLLC

(57) ABSTRACT

Provided is a criteria generation device and the like that allow high-speed that achieves high-speed search even if a database contains unsearchable information. The criteria generation device reads, from a memory, target search criteria including first search criteria and second search criteria representing criteria for retrieving information from a database; calculates, regarding the read target search criteria, truth values indicating whether or not search criteria being a subset of the first search criteria are satisfied; sets the calculated truth values for the subset of the search criteria;
(Continued)

and generates third search criteria depending on whether the second search criteria are true or false in accordance with whether or not the target search criteria for which the truth values are set are satisfied.

7 Claims, 9 Drawing Sheets

(51) Int. Cl.
*G06F 16/903* (2019.01)
*G06F 12/02* (2006.01)
*G06F 21/62* (2013.01)

(52) U.S. Cl.
CPC .. *G06F 21/6218* (2013.01); *G06F 2212/1036* (2013.01); *G06F 2212/465* (2013.01); *G06F 2212/7211* (2013.01)

(56) References Cited

U.S. PATENT DOCUMENTS

| | | | | |
|---|---|---|---|---|
| 2004/0030679 | A1* | 2/2004 | Gonnet | G06F 17/30448 |
| 2008/0059439 | A1* | 3/2008 | Fan | G06F 17/2205 |
| 2008/0133486 | A1* | 6/2008 | Fitzgerald | G06F 9/5077 |
| 2008/0235181 | A1* | 9/2008 | Faunce | G06F 17/30469 |
| 2009/0006329 | A1* | 1/2009 | Cong | G06F 17/2229 |
| 2009/0248652 | A1* | 10/2009 | Iwayama | G06F 17/30678 |
| 2010/0205167 | A1* | 8/2010 | Tunstall-Pedoe | G06F 17/30386 |
| | | | | 707/706 |
| 2012/0136858 | A1* | 5/2012 | Aslot | G06F 11/079 |
| | | | | 707/737 |
| 2013/0067012 | A1* | 3/2013 | Matzkel | G06F 21/6245 |
| | | | | 709/206 |
| 2014/0172850 | A1* | 6/2014 | Borkar | G06F 16/288 |
| | | | | 707/736 |
| 2014/0280342 | A1* | 9/2014 | Litherland | G06F 16/22 |
| | | | | 707/780 |
| 2014/0331277 | A1* | 11/2014 | Frascadore | H04L 63/20 |
| | | | | 726/1 |

FOREIGN PATENT DOCUMENTS

| | | |
|---|---|---|
| JP | 2010-108279 A | 5/2010 |
| JP | 2011-198079 A | 10/2011 |

OTHER PUBLICATIONS

International Search Report dated Aug. 11, 2015 in PCT/JP2015/002841.

Alexandra Boldyreva et al.: Order-Preserving Symmetric Encryption EUROCRYPT 2009: pp. 224-241.

Dawn Xiaodong Song et al.: Practical Techniques for Searches on Encrypted Data. In the Proceedings of IEEE Symposium on Research in Security and Privacy, 2000. pp. 44-55.

Craig Gentry: Fully homomorphic encryption using ideal lattices. STOC 2009, Proceedings of the forty-first annual ACM symposium on Theory of computing: pp. 169-178.

Raluca Ada Popa et al.: CryptDB: Protecting Confidentiality with Encrypted Query Processing. In Proceedings of the 23rd ACM Symposium on Operating Systems Principles (SOSP 2011): pp. 85-100.

\* cited by examiner

DATABASE SEARCH SYSTEM, DATABASE SEARCH METHOD, AND NON-TRANSITORY RECORDING MEDIUM

CROSS REFERENCE TO RELATED APPLICATIONS

This application is a National Stage of International Application No. PCT/JP2015/002841 filed Jun. 5, 2015, claiming priority based on Japanese Patent Application No. 2014-122962 filed Jun. 16, 2014, the contents of all of which are incorporated herein by reference in their entirety.

TECHNICAL FIELD

The present invention relates to a criteria generation device and the like that obtain search criteria for a database and the like.

BACKGROUND ART

DataBase as a Service (hereinafter referred to as "DBaaS") is a service for users to store their data into an external database (DataBase, herein after abbreviated as "DB"). As services for users to use external computing resources, such as cloud computing, come into widespread use, it is to be expected that DBaaS will become widely used.

DBaaS has the function for searching desired information in data (information) stored in a DB. A user uses the function to retrieve desired information on the basis of information stored in the DB. In this case, DBaaS executes a search instruction for extracting information desired by a user in response to DBaaS receiving the search instruction (query) sent from the user. Then, DBaaS sends the extracted information to the user.

However, the types of possible search instructions of DB may be limited. For example, if a DB uses an encryption scheme such as "searchable encryption" (for example, if the DB is an "encrypted database" as exemplified in NPL 1 and NPL 2), the types of possible search instructions of the DB are limited.

The searchable encryption is a technique that enables searches without decrypting encrypted information (encrypted text). For example, the searchable encryption enables a searching process based on encrypted information in response to a search instruction while maintaining confidentiality of the information to be searched by using cipher.

For example, NPL 3 discloses an example of searchable encryption called encryption with keyword search. In the encryption with keyword search, determination is made as to whether encrypted information is equal to a given value without decrypting the information.

Further, NPL 4 discloses one example of searchable encryption called order-preserving encryption, for example. In the order-preserving encryption, determination is made as to whether encrypted information satisfies criteria without decrypting the information.

Order-preserving encryption will now be described. An encrypted text by encrypting an unencrypted value x with a private key K is denoted as $E(K, x)$. Note that the encrypted text $E(K, x)$ is, for example, an integer value in accordance with the order-preserving encryption.

In this case, the necessary and sufficient condition of an unencrypted value "a" being greater than an unencrypted value "b" in the order-preserving encryption is that the value of an encrypted text $E(K, a)$ is greater than the value of an encrypted text $E(K, b)$. Accordingly, that "the value of $E(K, a)$ is greater than the value of $E(K, b)$" represents that "the value of $E(K, a)$ as an integer value is greater than the value of $E(K, b)$".

For example, an unencrypted value "a" is encrypted to an encrypted text $E(K, a)$ with a private key K. The encrypted DB receives a search instruction, for example, "retrieve all pieces of information satisfying search criteria 'greater than or equal to the value of $E(K, a)$'". The database extracts information in accordance with the received search instruction. In this case, the information is encrypted. Accordingly, desired information is generated by decrypting information extracted by the database.

An encrypted DB is one example of DBaaS and is a secure DB which is implemented by using searchable encryption. The encrypted DB stores information encrypted in accordance with searchable encryption. The encrypted DB receives search instructions written by encrypted search criteria in accordance with the searchable encryption and extracts information in accordance with the search instructions without decrypting the information.

However, the types of possible search instructions of an encrypted DB may be limited. For example, in an encrypted DB employing the match search encryption disclosed in NPL 3, the only type of possible search instructions without decryption is a search instruction for searching based on "whether encrypted information is equal to a given value". Further, in an encrypted DB employing the order-preserving encryption disclosed in NPL 4, the only type of possible search instructions without decryption is a search instruction for searching based on "whether encrypted information is greater than or equal to a given value".

Of course, an encrypted DB can decrypt encrypted information with a private key for the encryption and can make a search by using the decrypted information. However, it is undesirable for security reasons that the encrypted DB includes information about a private key for encryption. Therefore, most encrypted DBs employ a configuration that the encrypted DBs do not include information about private keys for encryption. In such a configuration, encrypted information stored in the encrypted DB cannot be decrypted, the types of possible search instructions of the encrypted DB are limited.

PTL 1 discloses one example of a database encryption system where information to be stored is encrypted and different encryption schemes are used even for the same encrypted information. The database encryption system extracts information in accordance with an instruction to make a match search as in the encrypted DB described above. However, according to the database encryption system, extractable information is limited.

CITATION LIST

Patent Literature

PTL 1: Japanese Patent Application Laid-Open Publication No. 2011-198079

Non Patent Literature

PTL 1: Raluca Ada Popa, Catherine M. S. Redfield, Nickolai Zeldovich, and Hari Balakrishnan. CryptDB: Protecting Confidentiality with Encrypted Query Processing. In Proceedings of the 23rd ACM Symposium on Operating Systems Principles (SOSP 2011): pp. 85-100

PTL 2: Craig Gentry: Fully homomorphic encryption using ideal lattices. STOC 2009, Proceedings of the forty-first annual ACM symposium on Theory of computing: pp. 169-178

PTL 3: Practical Techniques for Searches on Encrypted Data. D. Song, D. Wagner, and A. Perrig. In the Proceedings of IEEE Symposium on Research in Security and Privacy, 2000. pp. 44-55

PTL 4: Alexandra Boldyreva, Nathan Chenette, Younho Lee, Adam ONeill: Order-Preserving Symmetric Encryption. EUROCRYPT 2009: pp. 224-241

SUMMARY OF INVENTION

Technical Problem

As described above, for example, the types of possible search instructions of an encrypted DB may be limited. For example, in the case of a search instruction for retrieving information satisfying search criteria that "a value calculated by squaring is greater than or equal to 8", the encrypted DB cannot make a search according to the search instruction. This is because the encrypted DB does not include a private key required for encryption and therefore cannot decrypt the encrypted text.

In this case, therefore, the encrypted DB cannot necessarily extract information in accordance with a search instruction written by using desired search criteria.

A main object of the present invention is to provide a criteria generation device and the like that enable high-speed searching even in case of unsearchable information in a database.

Solution to Problem

In order to achieve the aforementioned object, as an aspect of the present invention, a criteria generation device including: criteria generation means for calculating, regarding target search criteria including first search criteria and second search criteria representing criteria for retrieving information from a database, truth values indicating whether or not search criteria being a subset of the first search criteria are satisfied, setting the calculated truth values for the subset of the search criteria; and generating third search criteria depending on whether the second search criteria are true or false in accordance with whether or not the target search criteria for which the truth values are set are satisfied.

In addition, as another aspect of the present invention, a criteria generation method including:

calculating, regarding target search criteria including first search criteria and second search criteria representing criteria for retrieving information from a database, truth values indicating whether or not search criteria being a subset of the first search criteria are satisfied, setting the calculated truth values for the subset of the search criteria; and generating third search criteria depending on whether the second search criteria are true or false in accordance with whether or not the target search criteria for which the truth values are set are satisfied.

Furthermore, the object is also realized by a criteria generation program, and a computer-readable recording medium which records the program.

Advantageous Effects of Invention

A criteria generation device and the like according to the present invention enable high-speed searching even in case of unsearchable information in a database.

DESCRIPTION OF EMBODIMENTS

To facilitate the understanding of the present invention, a problem to be solved by the present invention will be described first in detail.

An encrypted DB can execute an arbitrary search instruction including criteria other than predetermined search criteria by decrypting encrypted information. For example, if a search instruction includes certain search criteria other than predetermined search criteria, the encrypted DB decrypts all pieces of encrypted information in the encrypted DB and executes a search instruction on the decrypted information in accordance with the certain search criteria. This allows the encrypted DB to make a search according to a search instruction including search criteria other than predetermined search criteria.

The present inventor has found a problem with approaches to searching an encrypted DB on the basis of desired search criteria.

When a search is made using desired search criteria, criteria generation devices according to example embodiments of the present invention classify the desired search criteria as possible search criteria P for an encrypted DB and impossible search criteria Q for the encrypted DB. The criteria generation devices send a search instruction written by using the search criteria P to the encrypted DB. The criteria generation devices receive an encrypted text from the encrypted DB, decrypt the received encrypted text and make a search regarding to the search criteria Q base on the decrypted information.

The present inventor has found that a search in accordance with desired search criteria can be made by classifying the desired search criteria into the search criteria P and the search criteria Q and has derived methods for solving the problem described above.

Example embodiments of the present invention that can solve the problem will be described below with reference to the drawings.

First Example Embodiment

Figure 1:
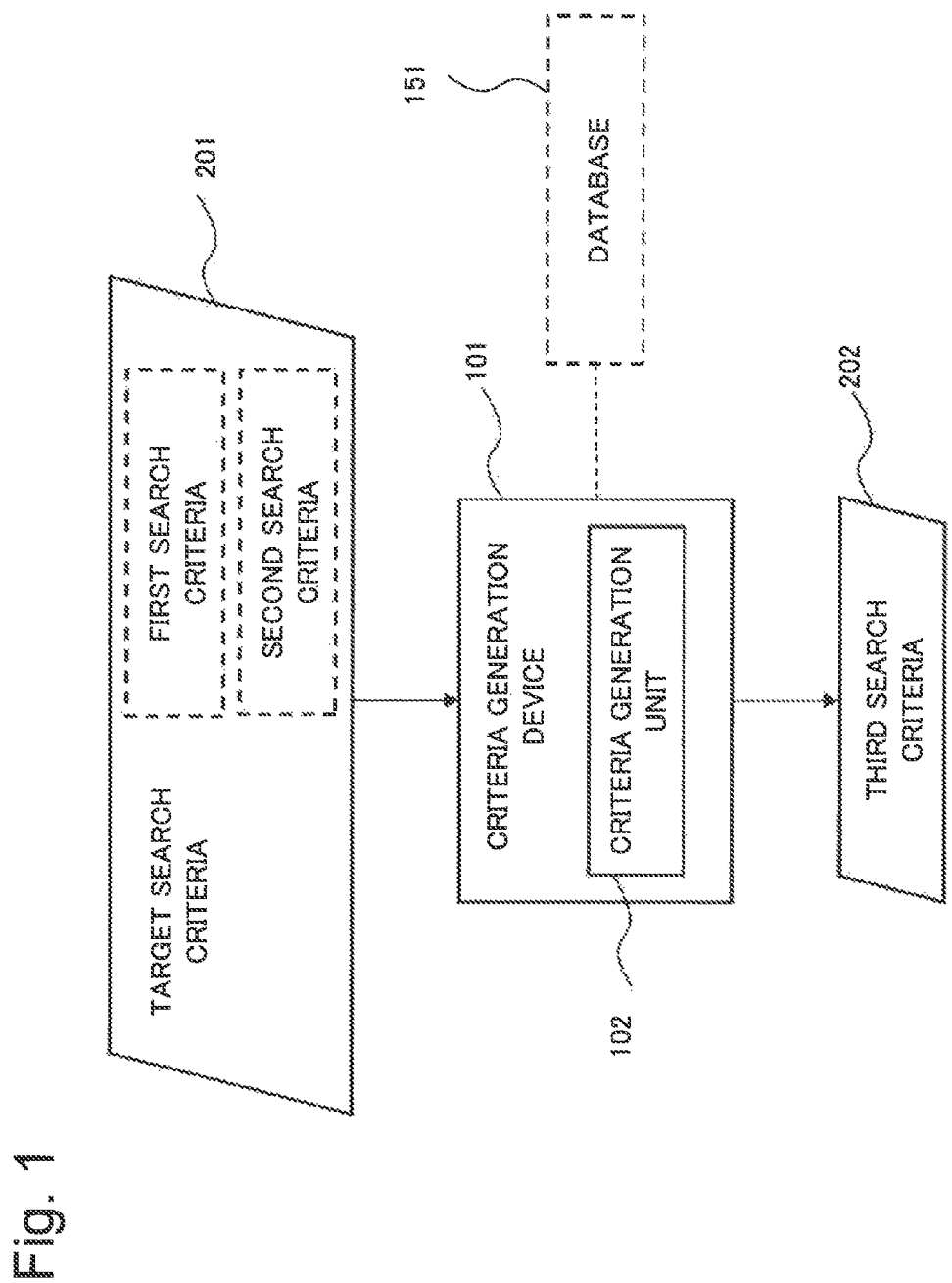
FIG. 1 is a block diagram illustrating a configuration of a criteria generation device according to a first example embodiment of the present invention.
Figure 2:
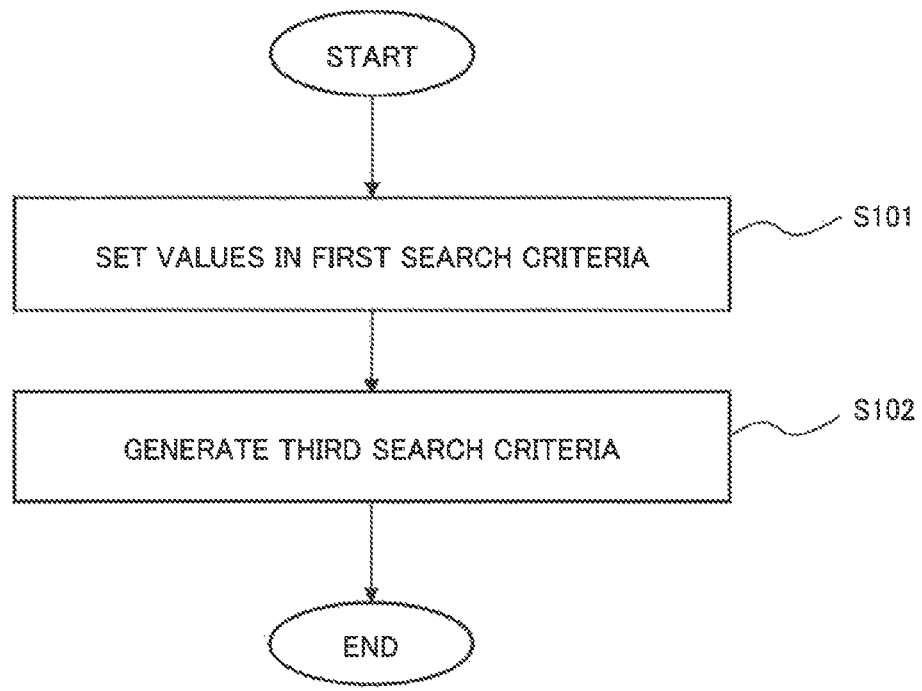
FIG. 2 is a flowchart illustrating a flow of a process in the criteria generation device according to the first example embodiment.

A configuration of a criteria generation device 101 according to a first example embodiment of the present invention and a process performed by the criteria generation device 101 will be described in detail with reference to FIGS. 1 and 2. FIG. 1 is a block diagram illustrating a configuration of the criteria generation device 101 according to the first example embodiment of the present invention. FIG. 2 is a flowchart illustrating a flow of a process in the criteria generation device 101 according to the first example embodiment.

The criteria generation device 101 according to the first example embodiment includes a criteria generation unit 102.

A user, for example, sends a search instruction written by using target search criteria 201 for retrieving desired information from a database 151 to the criteria generation device 101.

The target search criteria 201 include possible search criteria for the database 151 (hereinafter referred to as "first search criteria") and impossible search criteria for the database 151 (hereinafter referred to as "second search criteria"). In other words, the target search criteria 201 are search criteria including the first search criteria and the second search criteria.

For example, if the database 151 can store information encrypted according to order-preserving encryption, the database 151 can make a search according to a search instruction "retrieve all pieces of information satisfying search criteria P", written by using the search criteria P "a value greater than or equal to 'a'". In other words, the first search criteria include the search criteria P. On the other hand, the database 151 cannot make a search according to a search instruction "retrieve all pieces of information satisfying search criteria Q", written by using search criteria Q "a value calculated by squaring is greater than or equal to 8". This is because the database 151 does not include a private key required for encryption and therefore cannot decrypt encrypted texts. In other words, the second search criteria include search criteria Q.

For convenience of explanation, it is assumed that the first search criteria include search criteria $P_1$ and search criteria $P_2$; the second search criteria include search criteria $Q_1$ and search criteria $Q_2$. It is also assumed that the target search criteria 201 are represented by a function W indicated in Eqn. 1:

(Target search criteria201)=$W(P_1,P_2,Q_1,Q_2)$ (Eqn. 1)

where $W(P_1, P_2, Q_1, Q_2)=(P_1 \wedge Q_1) \vee (\neg P_2 \wedge Q_2)$. "$\wedge$" represents a logical AND operator; "$\vee$" represents a logical OR operator; "$\neg$" represents a NOT operator, and W is a function representing the target search criteria 201.

The target search criteria 201, the first search criteria and the second search criteria are not limited to the examples given above.

The target search criteria 201 illustrated in Eqn. 1 conceptually represent a logical expression and therefore its notation is not limited to the notation given above. For example, the target search criteria 201 may be represented according to Polish notation or reverse Polish notation.

In the present example embodiment, while criteria included in the first search criteria and the second search criteria are denoted by criteria-indicating symbols like $P_1$, the symbols may be addresses of particular storage areas in a main memory, for example, in some implementations. Accordingly, the areas pointed to by criteria-indicating symbols (addresses) may store truth values. Further, the target search criteria 201 represent operations based on truth values stored in particular storage areas.

Hereinafter, a truth value indicating that criteria are satisfied is referred to as "true" (true value, hereinafter denoted by "T") and a truth value indicating that criteria are not satisfied is referred to as "false" (false value, hereinafter denoted by "F").

Each of criteria included in search criteria can store a truth value, "T" or "F", in accordance with whether or not the criteria are satisfied (i.e. the "value representing true or false", a "truth value").

First, the criteria generation unit 102 receives target search criteria 201. The criteria generation unit 102 calculates values representing whether or not search criteria A included in the first search criteria in the received target search criteria 201 are satisfied (i.e. a "truth value"). Then the criteria generation unit 102 generates (creates) search criteria B where the calculated truth values are set to search criteria A in the target search criteria 201 (step S101).

Specially, at step S101, the criteria generation unit 102 calculates truth values indicating whether or not search criteria $P_1$ and search criteria $P_2$ are satisfied and sets the calculated truth values to search criteria $P_1$ and search criteria $P_2$ included in the target search criteria 201 to generate search criteria B. In this case, the criteria generation unit 102 may set the truth values for search criteria A included in the first search criteria to generate search criteria B.

For example, the criteria generation unit 102 calculates "T" and "F" for search criteria $P_1$ and sets the calculated truth value to a storage area pointed to by search criteria $P_1$ in the target search criteria 201, thereby obtaining search criteria B. The criteria generation unit 102 generates search criteria B where the truth values are set to search criteria A in the target search criteria 201 and generates search criteria C which are generated by combining search criteria B combined and the search criteria A via the logical AND operation. In this case, if the set truth value is true, the criteria generation unit 102 generates search criteria C where search criteria A combined and search criteria B are combined via the logical AND operation. On the other hand, if the set truth value is false, the criteria generation unit 102 generates search criteria C where the negation (form) of search criteria A combined and search criteria B are combined via the logical AND operation. The criteria generation unit 102 generates search criteria D where the generated search criteria C are combined via the logical OR operation.

Note that search criteria D generated by the criteria generation unit 102 is equivalent to the target search criteria 201. This is because search criteria C are generated by classifying the target search criteria 201 in accordance with the truth values of search criteria A and search criteria D is generated by combining the search criteria C, that are generated criteria by the classification, are combined via the logical operation.

Specifically, in this example, the criteria generation unit 102 first generates search criteria A where a truth value is set in search criteria $P_1$ included in the function W making up search criteria written in Eqn. 1 (i.e. the target search criteria 201). More specifically, the criteria generation unit 102 calculates $W(T, P_2, Q_1, Q_2)$ and $W(F, P_2, Q_1, Q_2)$ by setting a truth value to search criteria $P_1$ in the target search criteria 201.

Then the criteria generation unit 102 generates search criteria C is which two kinds of criteria, that is search criteria $P_1$ and the target search criteria 201 where the truth values are set, are connected via the logical AND operation. In the example described above, search criteria C can be obtained as search criteria in Eqn. 3 and Eqn. 4, which will be described later. For example, when the criteria generation unit 102 sets the true value "T" in search criteria $P_1$ in the target search criteria 201, the criteria generation unit 102 generates search criteria C written in Eqn. 3 (described later). On the other hand, when the criteria generation unit 102 sets the false value "F" in search criteria $P_1$, the criteria generation unit 102 generates search criteria C written in Eqn. 4 (described later).

The criteria generation unit 102 then generates search criteria D where the calculated search criteria C (for example Eqn. 3 and Eqn. 4) are combined via the logical OR operation. In other words, in this example, the criteria generation unit 102 generates search criteria D written in Eqn. 2.

$$(P_1 \wedge W(T,P_2,Q_1,Q_2)) \vee (\neg P_1 \wedge W(F,P_2,Q_1,Q_2)) \quad \text{Eqn. 2}$$

If search criteria $P_1$ are satisfied (i.e. $P_1$=T), then "$\neg P_1$" is false. Consequently, search criteria C where "$\neg P_1$" and $W(F, P_2, Q_1, Q_2)$ are combined via the logical AND operation (in this example, Eqn. 4) is false. In other words, search criteria C written in Eqn. 4 is false regardless of the value of $W(F, P_2, Q_1, Q_2)$. Because search criteria C written in Eqn. 4 in search criteria D written in Eqn. 2 is false in this case, search criteria D written in Eqn. 2 is equivalent to search criteria C written in Eqn. 3.

$$P_1 \wedge W(T,P_2,Q_1,Q_2) \quad \text{(Eqn. 3)}$$

On the other hand, when search criteria $P_1$ is not satisfied (i.e. $P_1$=F) in search criteria D written in Eqn. 2, then "$P_1$" is false. Consequently, search criteria C (Eqn. 3, in this example) which "$P_1$" and $W(T, P_2, Q_1, Q_2)$ are combined via the logical AND operation is false. In other words, the search criteria written in Eqn. 3 is false regardless of the value of $W(T, P_2, Q_1, Q_2)$. Because search criteria C written in Eqn. 3 in search criteria D written in Eqn. 2 is false in this case, search criteria D written in Eqn. 2 is equivalent to search criteria C written in Eqn. 4.

$$\neg P_1 \wedge W(F,P_2,Q_1,Q_2) \quad \text{(Eqn. 4)}$$

A process in the criteria generation unit 102 will be descried with reference to Eqn. 2 to Eqn. 4. The criteria generation unit 102 sets "T" in search criteria $P_1$ (i.e. search criteria A) included in target search criteria 201 to generate $W(T, P_2, Q_1, Q_2)$ (i.e. search criteria B). Because "T" is set in search criteria A, the criteria generation unit 102 generates search criteria C (Eqn. 3, for example) where search criteria A and search criteria B are combined via the logical AND operator.

Similarly, for example, the criteria generation unit 102 sets "F" in search criteria $P_1$ (i.e. search criteria A) included in the target search criteria 201 to generate $W(F, P_2, Q_1, Q_2)$ (i.e. search criteria B). Because "F" is set in search criteria A, the criteria generation unit 102 generates search criteria C (Eqn. 4, for example) where the negation of search criteria A and search criteria B are combined via the logical AND operator.

The criteria generation unit 102 then generate search criteria D by combining the generated search criteria C via the logical OR operation.

Consider a case where the criteria generation unit 102 calculates truth values "T" and "F" for search criteria $P_2$ in the generated search criteria D (Eqn. 2, for example) and sets the calculated truth values in a storage area for search criteria $P_2$. In this case, based on search criteria C written in Eqn. 3 and search criteria C written in Eqn. 4, the criteria generation unit 102 calculates search criteria equivalent to each of the search criteria.

More concretely, the criteria generation unit 102 generates search criteria E that is a search criteria where truth values are set in the storage area for search criteria $P_2$ included in search criteria D in relation to search criteria C written in Eqn. 3. In this case, the criteria generation unit 102 generates search criteria E "$P_1 \wedge W(T, T, Q_1, Q_2)$" and search criteria E "$P_1 \wedge W(T, F, Q_1, Q_2)$" by setting truth values to search criteria $P_2$ in search criteria C.

The criteria generation unit 102 then generates search criteria K that is a search criteria where calculated search criteria E and search criteria $P_2$ are combined via the logical AND operation. In this case, as in the process for search criteria $P_1$, the criteria generation unit 102 generates search criteria K where search criteria E and search criteria $P_2$ are combined via the logical AND operation if the set truth value is true. On the other hand, if the set truth value is false, the criteria generation unit 102 generates search criteria K where the negation (form) of search criteria $P_2$ and search criteria E are combined via the logical AND operation. In this example, the criteria generation unit 102 generates search criteria K "$P_1 \wedge P_2 \wedge W(T, T, Q_1, Q_2)$" and search criteria K "$P_1 \wedge \neg P_2 \wedge W(T, F, Q_1, Q_2)$" for search criteria C written in Eqn. 3.

The criteria generation unit 102 generates search criteria H where calculated search criteria K shown above are combined via the logical OR operation. In this example, the criteria generation unit 102 generates search criteria H written in Eqn. 5.

$$(P_1 \wedge P_2 \wedge W(T,T,Q_1,Q_2)) \vee (P_1 \wedge \neg P_2 \wedge W(T,F,Q_1,Q_2)) \quad \text{(Eqn. 5)}$$

Additionally, the criteria generation unit 102 generates search criteria H written in Eqn. 6 for the search criteria written in Eqn. 4 in search criteria D by performing a process similar to the process for computing Eqn. 5.

$$(\neg P_1 \wedge P_2 \wedge W(F,T,Q_1,Q_2)) \vee (\neg P_1 \wedge \neg P_2 \wedge W(F,F,Q_1,Q_2)) \quad \text{(Eqn. 6)}$$

The criteria generation unit 102 generates search criteria J where calculated search criteria H are combined together via the logical OR operation. In this example, the criteria generation unit 102 generates search criteria J where the search criteria written in Eqn. 5 and the search criteria written in Eqn. 6 are combined (Eqn. 5 $\vee$ Eqn. 6 in this example) (step S102).

Consequently, search criteria J generated by the criteria generation unit 102 are equivalent to search criteria D. This is because search criteria D is classified based on the truth values of the search criteria to generate search criteria K and search criteria J is generated by combining generated search criteria K, that is resulting from the classification, via the logical OR operation.

If the target search criteria 201 include an additional first search criteria, the criteria generation unit 102 may perform a process similar to the process performed when truth values are set in $P_1$ or $P_2$ for the additional first search criteria.

The criteria generation unit 102 then determines whether or not each of search criteria K combined via the logical OR operation in search criteria J (for example, Eqn. 5 $\vee$ Eqn. 6) calculated by the processes described above is satisfied (i.e. whether each of search criteria K is satisfied or not). In this case, the criteria generation unit 102 determines whether or not each of search criteria K "$P_1 \wedge P_2 \wedge W(T, T, Q_1, Q_2)$", search criteria K "$P_1 \wedge \neg P_2 \wedge W(T, F, Q_1, Q_2)$", search criteria K "$\neg P_1 \wedge P_2 \wedge W(F, T, Q_1, Q_2)$", and search criteria K "$\neg P_1 \wedge \neg P_2 \wedge W(F, F, Q_1, Q_2)$" are satisfied.

As one example, process for determining whether search criteria K "$\neg P_1 \wedge P_2 \wedge W(F, T, Q_1, Q_2)$" is satisfied or not will be described. As shown in Eqn. A, $W(F, T, Q_1, Q_2)$ are false regardless of $Q_1, Q_2$.

$$W(F,T,Q_1,Q_2) = (F \wedge Q_1) \vee (\neg T \wedge Q_2) = F \qquad \text{(Eqn. A)}$$

In other words, $W(F, T, Q_1, Q_2)$ is not satisfied regardless of the second search criteria (in this example, $Q_1$ and $Q_2$).

According to Eqn. A, "$\neg P_1 \wedge P_2 \wedge W(F, T, Q_1, Q_2)$" in Eqn. 6 is false regardless of $Q_1, Q_2$. Therefore, the criteria generation unit 102 determines that search criteria K "$\neg P_1 \wedge P_2 \wedge W(F, T, Q_1, Q_2)$" are not satisfied (i.e. is false) regardless of the second search criteria.

Similarly, the criteria generation unit 102 determines whether or not each of search criteria K "$P_1 \wedge P_2 \wedge W(T, T, Q_1, Q_2)$", search criteria K "$P_1 \wedge \neg P_2 \wedge W(T, F, Q_1, Q_2)$", and search criteria K "$\neg P_1 \wedge \wedge P_2 \wedge W(F, F, Q_1, Q_2)$" are satisfied. Since result, that is whether the three search criteria K are satisfied or not, depends on the second search criteria, the criteria generation unit 102 determines that result, that is whether the three search criteria K are satisfied or not, depends on the second search criteria.

Then the criteria generation unit 102 calculates third search criteria 202 where search criteria, whose truth values are determined in accordance with the second search criteria, in the search criteria K are combined together via the logical OR operation. In this example, the criteria generation unit 102 generates search criteria "$(P_1 \wedge P_2 \wedge W(T, T, Q_1, Q_2)) \vee (P_1 \wedge \neg P_2 \wedge W(T, F, Q_1, Q_2)) \vee (\neg P_1 \wedge \neg P_2 \wedge W(F, F, Q_1, Q_2))$" as the third search criteria 202.

Consequently, the third search criteria 202 generated by the criteria generation unit 102 are equivalent to the target search criteria 201. This is because the target search criteria 201 are equivalent to search criteria D, search criteria D are equivalent to search criteria J, and search criteria J are equivalent to the third search criteria 202.

In the example described above, the criteria generation unit 102 calculates truth values for the search criteria included in the first search criteria one by one and sets each calculated truth value in the search criteria. The criteria generation unit 102 may calculate truth values together and may set the calculated truth values in the search criteria at a time. In other word, the criteria generation unit 102 may set truth values, (T, T), (T, F), (F, T), and (F, F) for search criteria ($P_1$, $P_2$). The process for the criteria generation unit 102 to set truth values is not limited to the example described above. In the description given above, each of the first search criteria and the second search criteria includes two criteria. Each of the first and second search criteria does not necessarily need to include two criteria and the first and second search criteria do not necessarily need to include the same number of criteria. Further, the target search criteria 201 do not need to be search criteria written in Eqn. 1 but instead may be other search criteria.

Further, the criteria generation unit 102 does not need to set truth values for all of the criteria included in the first search criteria but instead may set truth values for a subset of the criteria included in the first search criteria. For example, if the criteria generation unit 102 sets only search criteria $P_1$, the criteria generation unit 102 generates search criteria (Eqn. 2), that is equivalent to search criteria written in Eqn. 1, as the third search criteria 202. The third search criteria 202 are equivalent to the target search criteria 201 and does not include search criteria that are not satisfied when truth values are set for a subset of the criteria included in the target search criteria 201. In other words, the third search criteria 202 is search criteria that are determined to be satisfied or not depending on whether or not the second search criteria are satisfied among the target search criteria 201.

Hereinafter, search criteria that are determined to be satisfied or not regardless of whether second search criteria are satisfied or not among target search criteria 201 are also referred to as "fourth search criteria".

In other words, the criteria generation unit 102 sets truth values in criteria included in the first search criteria in target search criteria 201, determines whether or not the target search criteria are satisfied on the basis of the set truth values, and generates third search criteria on the basis of the result of determination. In this case, the criteria generation unit 102 may generate a fourth search criteria.

Advantageous effects of the criteria generation device 101 according to the first example embodiment will be described next.

The criteria generation device 101 enables high-speed search processing even if the search processing includes unsearchable information for a database.

This is because search processing for the third search criteria 202 can be performed at lower cost than the search processing for other search criteria. In other words, a search result for the third search criteria 202 involves smaller amount of information than the search result for other search criteria.

The reason why the amount of information is reduced will now be described in detail. For convenience of explanation, it is assumed that the first search criteria include search criteria $P_1$ and search criteria $P_2$. It is also assumed that the quantity of data that satisfy search criteria $P_1$ is $N_4$ and the quantity of data that satisfy search criteria "$\neg P_2$" is $N_5$. In this case, the device disclosed in PTL 1 or the like generates a disjunctive normal form.

Accordingly, the device sends two search instructions, which is a search instruction written by using search criteria $P_1$ and a search instruction written by using search criteria "$\neg P_2$", to a database 151. The database 151 receives the search instructions and extracts a quantity ($N_4+N_5$) of data in accordance with the received search instructions.

For convenience of explanation, it is assumed that the quantity of data that satisfy search criteria "$P_1 \wedge P_2$" is denoted by $N_1$, the quantity of data that satisfy search criteria "$P_1 \wedge \neg P_2$" is denoted by $N_2$, and the quantity of data that satisfy search criteria "$\neg P_1 \wedge \neg P_2$" is denoted by $N_3$.

In this case, because search criteria "$(P_1 \wedge P_2) \vee (P_1 \wedge \neg P_2)$" are equivalent to search criteria $P_1$, the quantity N4 of data that satisfy search criteria $P_1$ is equal to the sum of the quantity $N_1$ of data that satisfy search criteria "$P_1 \wedge P_2$" and the quantity $N_2$ of data that satisfy search criteria "$P_1 \wedge \neg P_2$". Further, because the search criteria "$(P_1 \wedge \neg P_2) \vee (\neg P_1 \wedge \neg P_2)$" are equivalent to search criteria "$\neg P_2$", the quantity $N_5$ of data that satisfy the search criteria "$\neg P_2$" is equal to the sum of the quantity $N_2$ of data that satisfy the search criteria "$P_1 \wedge \neg P_2$" and the quantity $N_3$ of data that satisfy the search criteria "$\neg P_1 \wedge \neg P_2$". Therefore, according to the method disclosed in PTL 1 and the like, a quantity ($N_1+2\times N_2+N_3$) of data (search results) satisfying the search criteria "$P_1 \vee \neg P_2$" are received. The quantity is the sum of the quantity of data satisfying search criteria $P_1$ and the quantity of data satisfying the search criteria "$\neg P_2$".

In contrast, the criteria generation device 101 according to the present example embodiment receives data in accordance with a search instruction written by using the third search criteria 202 (for exempla, Eqn. 5 ∨ search criteria "$\neg P_1 \wedge \neg P_2 \wedge W(F, F, Q_1, Q_2)$") because $W(F, T, Q_1, Q_2)$ is false as described in the description of the processing at step S102. In other word, the criteria generation device 101 receives a data quantity equal to the sum of the quantity $N_1$ of data that satisfy the search criteria "$P_1 \wedge P_2$", the quantity $N_2$ of data that satisfy the search criteria "$P_1 \wedge \neg P_2$", and the quantity $N_3$ of data that satisfy the search criteria "$\neg P_1 \wedge \neg P_2$". In other words, the criteria generation unit 101 receives a quantity $(N_1+N_2+N_3)$ of data. Therefore, the quantity of data (the amount of information) received is smaller than the quantity of data received according to the method disclosed in PTL 1 or the like.

Similarly, if first search criteria include three or more search criteria and overlapping data, the search method disclosed in PTL 1 or the like extracts the overlapping data more than once. In contrast, the criteria generation device 101 according to the present example embodiment divides the overlapping portions into search criteria the search results of which are independent of one another. Consequently, the search results do not include overlapping data and therefore the amount of information included in the extracted results is smaller.

Further, the criteria generation device 101 generates third search criteria 202 equivalent to target search criteria 201 on the basis of the target search criteria 201 without converting to a disjunctive normal form.

Known processing methods for converting a logical expression of target search criteria 201 or the like to a disjunctive normal form include a processing method that uses de Morgan's laws. Detailed description of the processing method will therefore be omitted. When the processing method is used, the disjunctive normal form includes $2^n$ terms (2 to the n-th power, where n is the number of terms included in a logical expression before conversion) at worst.

However, the criteria generation device 101 according to the present example embodiment sets values (i.e. truth values) in the first search criteria included in target search criteria 201 to generate third search criteria 202 on the basis of the target search criteria 201. Because the number of inconsistent terms in the target search criteria 201 is reduced by setting truth values in the target search criteria 201, the number of truth values set by the criteria generation unit 102 is less than $2^n$. Consequently, the number of the terms included in the third search criteria 202 is smaller than $2^n$ and therefore the criteria generation device 101 can efficiently generate the third search criteria 202 on the basis of the target search criteria 201.

In other words, the criteria generation device 101 according to the present example embodiment enables high-speed searching even if the searching contains unsearchable information for a database.

The criteria generation device 101 is not limited to the example described above. The first search criteria and the second search criteria may be search criteria that are irrelevant to whether or not the database 151 can make a search with the search criteria. In other words, the first search criteria and the second search criteria may be simply different from each other. The same applies to other example embodiments of the present invention.

Second Example Embodiment

A second example embodiment of the present invention based on the first example embodiment described above will be described next.

The following description focuses on elements that are characteristic of the present example embodiment, and elements that are similar to elements in the first example embodiment described above are given the same reference numerals and repeated description thereof will be omitted.

Figure 3:
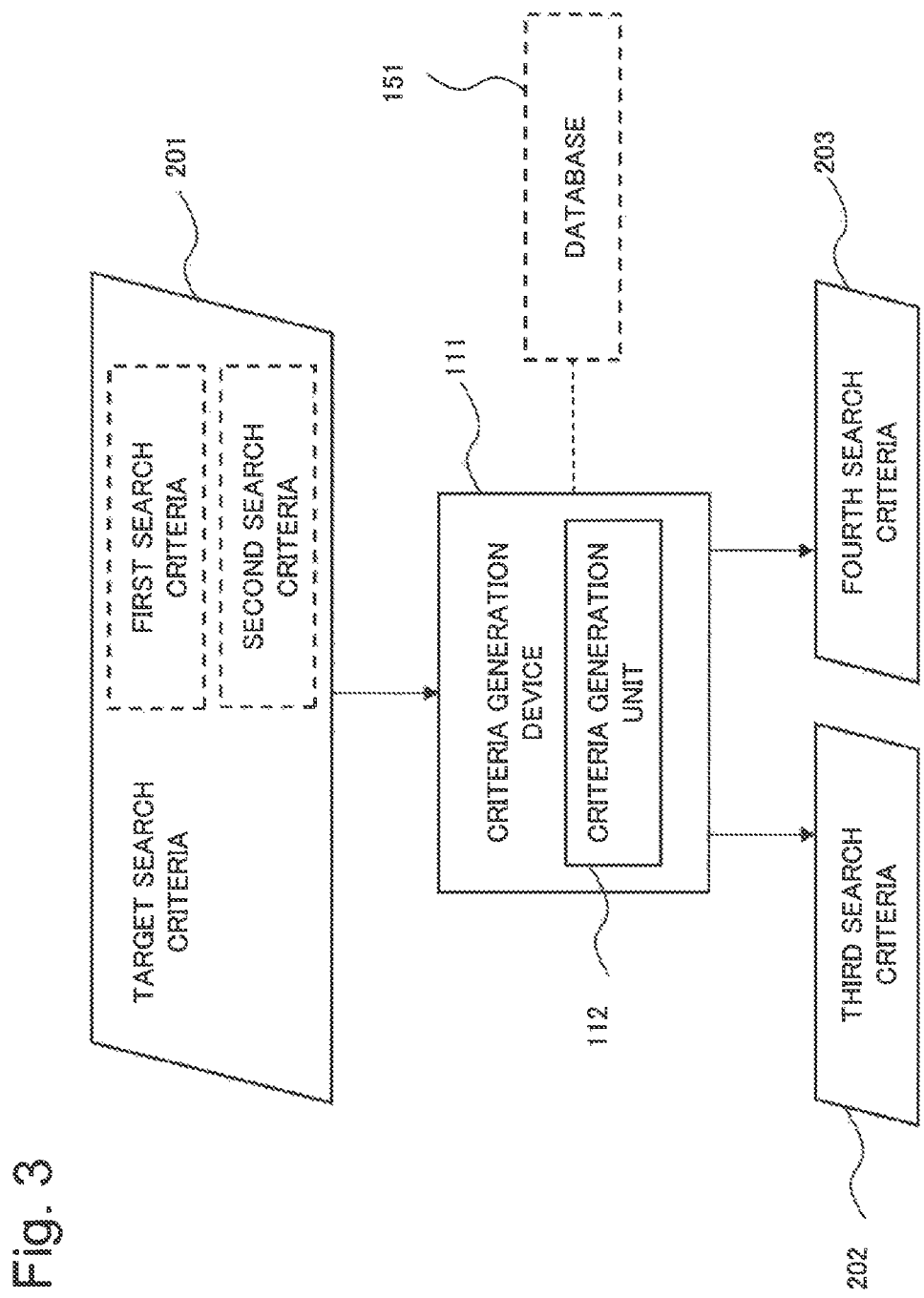
FIG. 3 is a block diagram illustrating a configuration of a criteria generation device according to a second example embodiment of the present invention.
Figure 4:
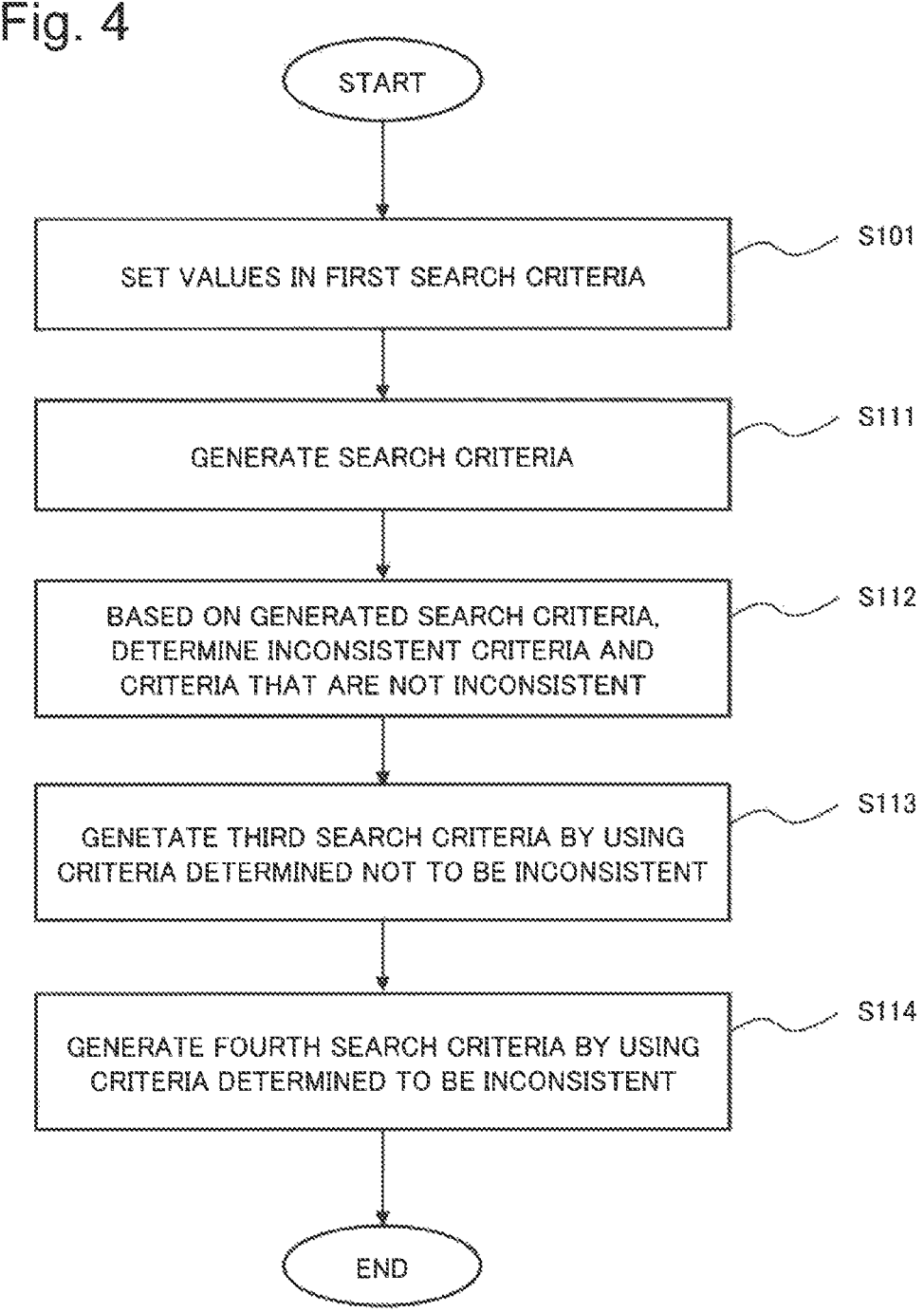
FIG. 4 is a flowchart illustrating a process flow in the criteria generation device according to the second example embodiment.

A configuration of a criteria generation device 111 according to the second example embodiment and a process performed by the criteria generation device 111 will be described with reference to FIGS. 3 and 4. FIG. 3 is a block diagram illustrating a configuration of the criteria generation device 111 according to the second example embodiment of the present invention. FIG. 4 is a flowchart illustrating a process flow in the criteria generation device 111 according to the second example embodiment.

The criteria generation device 111 according to the second example embodiment includes a criteria generation unit 112.

First, the criteria generation unit 112 receives target search criteria 201. The criteria generation unit 112 then calculates truth values representing whether or not search criteria A included in the received target search criteria 201 are satisfied in accordance with a procedure similar to the procedure illustrated in the description of the first example embodiment. Then the criteria generation unit 112 generates (creates) search criteria B where the calculated truth values are set in search criteria A in the target search criteria 201 (step S101).

The criteria generation unit 112 then generates search criteria C where search criteria A and search criteria B are combined together via a logical AND operation. Then the criteria generation unit 112 generates search criteria K by performing a process similar to the process illustrated in the description of the first example embodiment (step S111). In the example given in the description of the first example embodiment, the criteria generation unit 112 generates four search criteria K written in Eqn. 7 to Eqn. 10.

$$P_1 \wedge P_2 \wedge W(T,T,Q_1,Q_2) \quad \text{(Eqn. 7)},$$

$$P_1 \wedge \neg P_2 \wedge W(T,F,Q_1,Q_2) \quad \text{(Eqn. 8)},$$

$$\neg P_1 \wedge P_2 \wedge W(F,T,Q_1,Q_2) \quad \text{(Eqn. 9)},$$

$$\neg P_1 \wedge \neg P_2 \wedge W(F,F,Q_1,Q_2) \quad \text{(Eqn. 10)}.$$

Four search criteria K written in Eqn. 7 to Eqn. 10 are search criteria generated by setting truth values (T, F) to search criteria ($P_1$, $P_2$ in this example) included in the target search criteria 201 (function W) and by combining each search criteria, where the truth values are set, via the logical AND operations shown as in Eqn. 7 to 10.

The criteria generation unit 112 then determines whether or not each of the generated search criteria K are inconsistent, that is whether or not the search criteria K are always unsatisfied (step S112). In this example, the criteria generation unit 112 determines whether or not each of search criteria K written in Eqn. 7 to Eqn. 10 is inconsistent (inconsistent formula). The criteria generation unit 112 performs the process described above by determining whether or not each of the search criteria where truth values are set (for example $W(F, F, Q_1, Q_2)$ in Eqn. 10) is inconsistent.

Because "$F \wedge Q_1$" and "$\neg T \wedge Q_2$" are logical AND operations on the false value, the results of the operations are both false. Therefore, according to the function W in Eqn. 1, $W(F, T, Q_1, Q_2)$ is inconsistent regardless of $Q_1$, $Q_2$, as shown in Eqn. 9.

$$W(F,T,Q_1,Q_2)=(F \wedge Q_1) \vee (\neg T \wedge Q_2)=F.$$

Therefore, the criteria generation unit 112 determines that the search criteria written in Eqn. 9 is inconsistent and the search criteria written in Eqn. 7, Eqn. 8 and Eqn. 10 are not inconsistent.

The criteria generation unit 112 then generates fourth search criteria 203, that results in a value of false regardless of second search criteria $Q_1$ and second search criteria $Q_2$, by combining search criteria determined as inconsistent criteria via a logical OR operator (step S114). In this example, the criteria generation unit 112 generates the search criteria written in Eqn. 9 as the fourth search criteria 203. In other words, the fourth search criteria 203 represents search criteria that result in a value of false as the operation result regardless of the second search criteria.

Additionally, the criteria generation unit 112 generates the third search criteria 202 by combining search criteria to be determined not to be inconsistent via a logical OR operator (step S113). In this example, the criteria generation unit 112 generates search criteria, (Eqn. 7 $\vee$ Eqn. 8 $\vee$ Eqn. 10), as the third search criteria 202.

The criteria generation unit 112 may perform the processing illustrated at step S113 and then perform the processing illustrated at step S114.

Advantageous effects of the criteria generation device 111 according to the second example embodiment will be described next.

The criteria generation device 111 according to the present example embodiment has the advantageous effect of enabling faster searching, in addition to the advantageous effects of the criteria generation device 101 according to the first example embodiment.

This is for the following reasons:
(Reason 1) The configuration of the criteria generation device 111 according to the second example embodiment includes the configuration of the criteria generation device 101 according to the first example embodiment.
(Reason 2) A database 151 does not need to execute a search instruction written by using fourth search criteria 203 generated by the criteria generation unit 112.

The reason why the criteria generation device 111 enables faster searching will be detailed below. The fourth search criteria 203 are always unsatisfied as described with respect to the processing at step S114. For example, even if the database 151 extracts information in accordance with a search instruction written by using the fourth search criteria 203, the extracted information is empty (null) information. Therefore, the search instruction written by using the fourth search criteria 203 is an instruction that does not need to be executed.

Consequently, in a system that searches for information in a database 151 via a communication network, for example, the criteria generation device 111 can reduce the traffic on the communication network, therefore enabling high-speed searching.

The criteria generation device 111 according to the present example embodiment performs a process similar to the process described above even if first search criteria include three or more search criteria.

Third Example Embodiment

A third example embodiment of the present invention which is based on the first example embodiment described previously will be described next.

The following description focuses on elements that are characteristic of the present example embodiment, and elements that are similar to elements in the first example embodiment are given the same reference numerals and repeated description thereof will be omitted.

Figure 5:
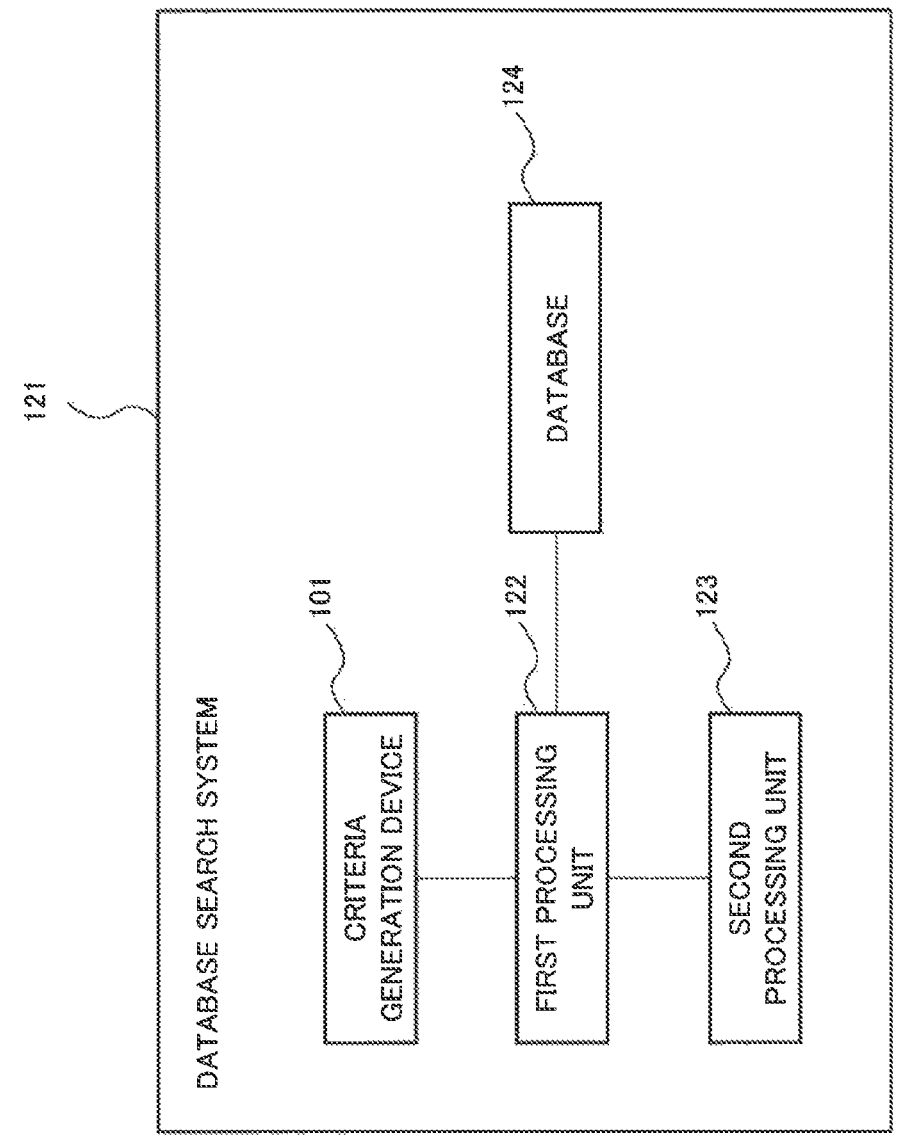
FIG. 5 is a block diagram illustrating a configuration of a database search system according to a third example embodiment of the present invention.
Figure 6:
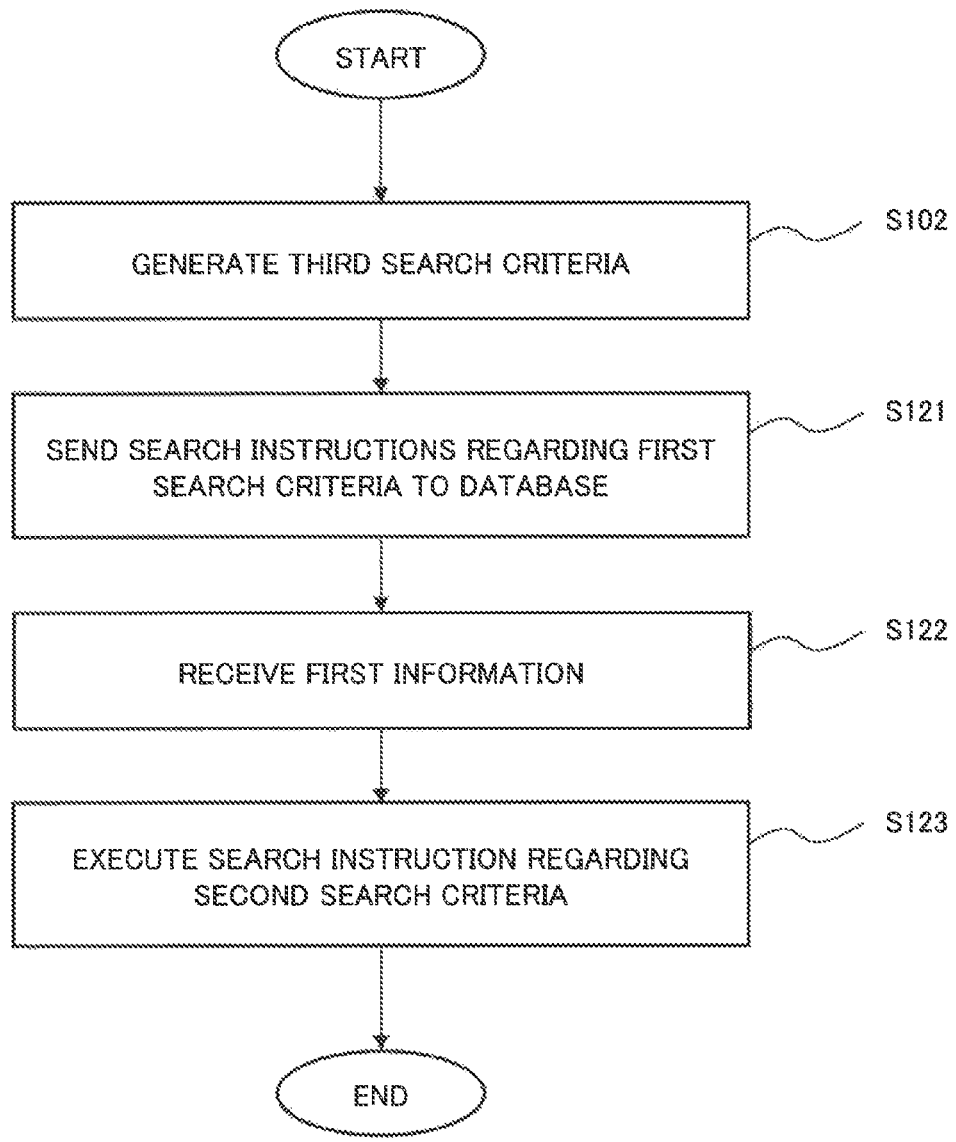
FIG. 6 is a flowchart illustrating a process flow in the database search system according to the third example embodiment.

A configuration of a database search system 121 according to the third example embodiment and a process performed by the database search system 121 will be described with reference to FIGS. 5 and 6. FIG. 5 is a block diagram illustrating a configuration of the database search system 121 according to the third example embodiment of the present invention. FIG. 6 is a flowchart illustrating a process flow in the database search system 121 according to the third example embodiment.

The database search system 121 according to the third example embodiment includes a criteria generation device 101, a first processing unit 122, a second processing unit 123 and a database 124. The criteria generation device 101 is the device described in the description of the first example embodiment of the present invention.

The database 124 is an external DB that uses searchable encryption such as the order-preserving encryption. In this case, the types of possible search instructions for the database 124 are limited.

First, the criteria generation device 101 generates third search criteria 202 by performing a process similar to the process described in the description of the first example embodiment (step S102). The criteria generation device 101 may further generate fourth search criteria 203.

Then the first processing unit 122 sends a search instruction written by using first search criteria among the third search criteria 202 to the database 124 (step S121).

In the example described above, the first processing unit 122 generates, as the third search criteria 202, search criteria for combining search criteria written in Eqn. 7, Eqn. 8 and Eqn. 10 described with respect to the second example embodiment via a logical OR operator. In this case, the first processing unit 122 sends a search instruction written by using search criteria "$P_1 \wedge P_2$" in Eqn. 7, a search instruction written by using search criteria "$P_1 \wedge \neg P_2$" in Eqn. 8, and a search instruction written by using search criteria "$\neg P_1 \wedge \neg P_2$" in Eqn. 10 to the database 124.

The database 124 receives the search instructions sent from the first processing unit 122 and extracts information (hereinafter referred to as the "first information") in accordance with the received search instructions. In other words, the database 124 extracts the first information in accordance with the search instructions.

For convenience of explanation, the first information extracted in accordance with "$P_1 \wedge P_2$" is denoted by Ans[T, T]. The first information extracted in accordance with "$P_1 \wedge \neg P_2$" is denoted by Ans[T, F]. The first information extracted in accordance with "$\neg P_1 \wedge \neg P_2$" is denoted by Ans[F, F]. If the database 124 is encrypted DB, these pieces of first information are encrypted texts.

The database 124 sends the extracted first information to the second processing unit 123.

The second processing unit 123 receives the extracted first information (step S122). The second processing unit 123 then executes the search instructions written by using second search criteria that are impossible search criteria for the database 124. In other word, in the case of target search criteria 201 illustrated in Eqn. 1, the second processing unit 123 executes search instructions written by using search criteria "W(T, T, $Q_1$, $Q_2$)", search criteria "W(T, F, $Q_1$, $Q_2$)" and search criteria "W(F, F, $Q_1$, $Q_2$)". The second processing unit 123 executes search instructions written by using search criteria "$Q_1$" search criteria "$Q_1 \vee Q_2$" and search criteria "$Q_2$".

The second processing unit 123 then generates, for the search criteria "W(T, T, $Q_1$, $Q_2$)", a subset that is common to Ans[T, T] and a search result for the search criteria "$Q_1$". In addition, for the search criteria "W(T, F, $Q_1$, $Q_2$)", the second processing unit 123 generates a subset that is common to Ans[T, F] and a search result for the search criteria "$Q_1 \vee Q_2$". Similarly, for the search criteria "W(F, F, $Q_1$, $Q_2$)", the second processing unit 123 generates a subset that is common to Ans[F, F] and a search result for the search criteria "$Q_2$".

In other words, based on search criteria generated for truth values set by the criteria generation unit 102 in the criteria generation device 101, the second processing unit 123 calculates results according to the search instructions written by using the search criteria.

The second processing unit 123 then calculates a result for the search instruction, which is written by using desired search criteria, by calculating the union of the calculated common subsets (step S123).

If the database 124 is an encrypted DB, the second processing unit 123 may decrypt information extracted by the database 124, such as Ans[T, F].

Advantageous effects of the database search system 121 according to the third example embodiment will be described next.

The database search system 121 according to the present example embodiment has the advantageous effect of efficiently extracting information, in addition to the advantageous effects of the criteria generation device 101 according to the first example embodiment.

This is for the following reasons:
(Reason 1) The configuration of the database search system 121 according to the third example embodiment includes the configuration of the criteria generation device 101 according to the first example embodiment.
(Reason 2) The database 124 extracts information in accordance with a search instructions written by using search criteria generated by the criteria generation device 101.

Reason 2 will be described in further detail.

For the convenience of explanation, it is assumed that the criteria generation device 101 receives search criteria written in Eqn. 1. It is also assumed that the database stores 1500 pieces of data a(i) (where 1≤i≤1500). Further, it is assumed that 999 pieces of data a(i) (where 1≤i≤999) satisfy search criteria $P_1$ and search criteria $P_2$. It is also assumed that only one piece of data a(1000) satisfies search criteria $P_1$ alone and that 499 pieces of data a(i) (where 1002≤i≤1500) satisfy search criteria $P_2$ alone. It is also assumed that only one piece of data a(1001) satisfies neither of search criteria $P_1$ and $P_2$.

In this example, a common database search system, that converts search criteria to a disjunctive normal form, sends two search instructions, which is a search instruction written by using possible search criteria $P_1$ of the database 124 and a search instruction written by using search criteria $P_2$, to a database 124 among search criteria written in Eqn. 1. The database 124 receives the search instruction written by using search criteria $P_1$ and the search instruction written by using search criteria $P_2$ and extracts information in accordance with each of the search instructions.

In other word, since the data satisfying $P_1$ is a(i) (where 1≤i≤1000), the number of pieces of the data is 1000. Since the data satisfying $P_2$ is a(i) (where 1≤i≤999 and 1002≤i≤1500), the number of pieces of the data is 1498. The database 124 therefore extracts 2498 pieces of data in total and sends the extracted data to the second processing unit 123.

On the other hand, the criteria generation device 101 according to the present example embodiment performs the process described above to generate search criteria written as (Eqn. 7 $\vee$ Eqn. 8 $\vee$ Eqn. 10).

The first processing unit 122 sends search instructions written by using search criteria written in Eqn. 7, search criteria written in Eqn. 8, and search criteria written in Eqn. 10 described in the description of the second example embodiment to the database 124. In other words, the first processing unit 122 sends search instructions written using three search criteria "$P_1 \wedge P_2$", "$P_1 \wedge \neg P_2$" and "$\neg P_1 \wedge \neg P_2$" to the database 124.

The database 124 receives the three search instructions and extracts information in accordance with the received search instructions.

In this example, since 999 pieces of data a(i) satisfy search criteria $P_1$ and search criteria $P_2$ (where 1≤i≤999), the number of pieces of data that satisfy "$P_1 \wedge P_2$" is 999. Since data that satisfies only search criteria $P_1$ is a(1000), only one piece of data satisfies "$P_1 \wedge \neg P_2$". Since data that satisfies neither of search criteria $P_1$ and search criteria $P_2$ is a(1001), only one piece of data satisfies "$\neg P_1 \wedge \neg P_2$". Accordingly, the database 124 extracts 1001 pieces of data in total and sends the extracted pieces of data to the second processing unit 123.

The criteria generation device 101 according to the present example embodiment thus reduces the number of pieces of data extracted by the database 124 from 2498 to 1001. Among pieces of data that satisfy $P_1$ (i.e. a(i), where 1≤i≤1000), 999 pieces of data satisfy $P_2$. In this way, the criteria generation device 101 according to the present example embodiment prevents the database 124 from extracting overlapping data, thereby enabling efficient search.

Fourth Example Embodiment

A fourth example embodiment of the present invention which is based on the third example embodiment described previously will be described next.

The following description focuses on elements that are characteristic of the present example embodiment, and elements that are similar to elements in the third example embodiment described above are given the same reference numerals and repeated description thereof will be omitted.

Figure 7:
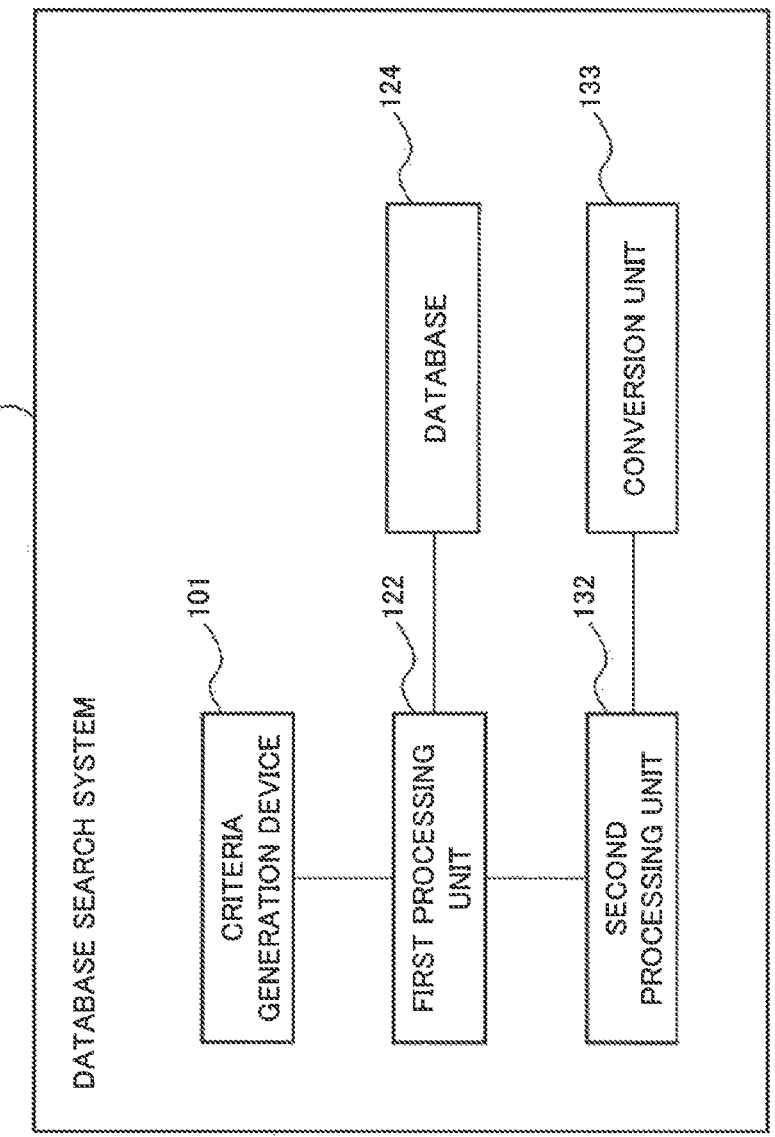
FIG. 7 is a block diagram illustrating a configuration of a database search system according to a fourth example embodiment of the present invention.
Figure 8:
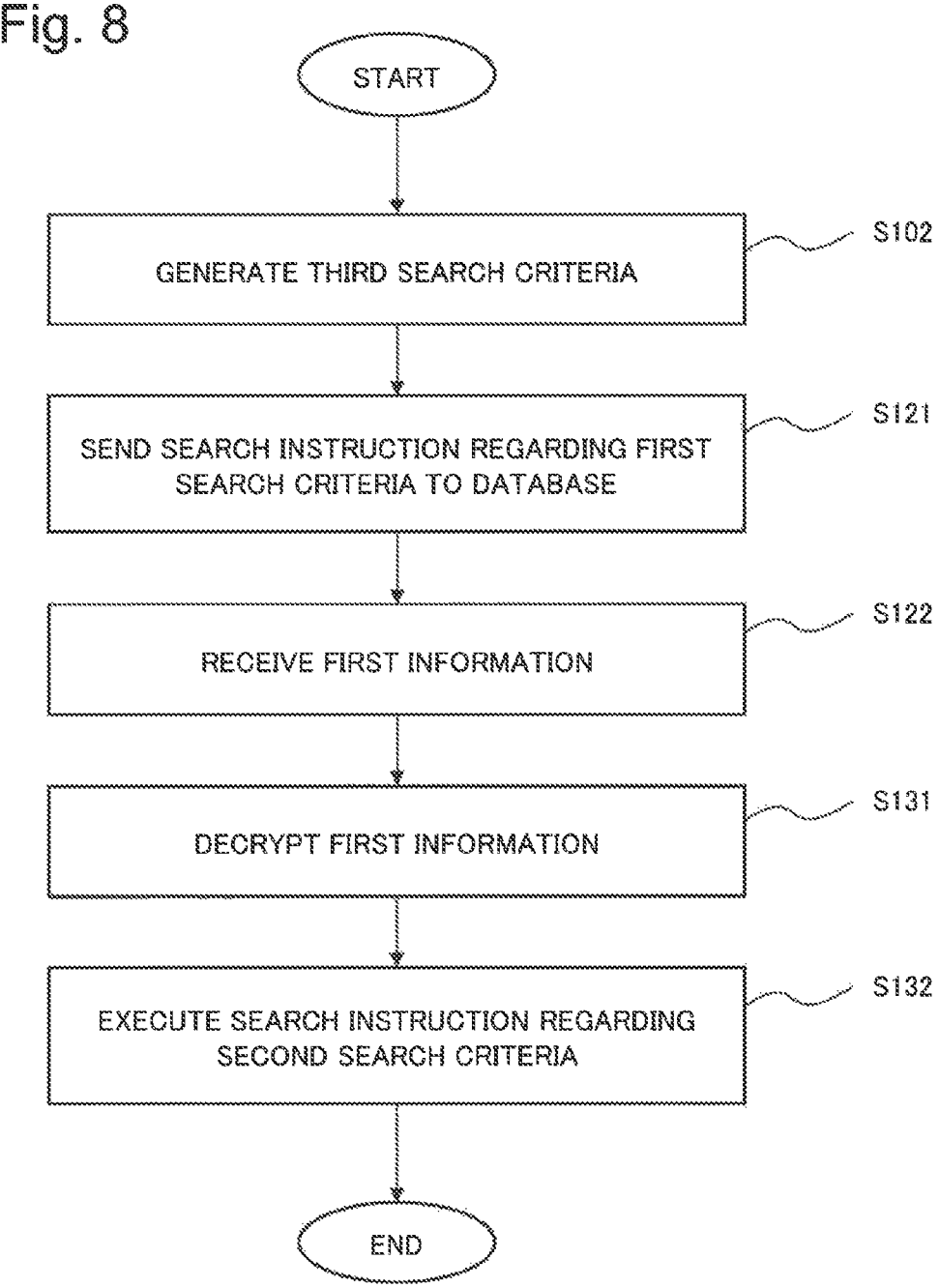
FIG. 8 is a flowchart illustrating a process flow in the database search system according to the fourth example embodiment.

A configuration of a database search system 131 according to the fourth example embodiment and a process performed by the database search system 131 will be described with reference to FIGS. 7 and 8. FIG. 7 is a block diagram illustrating a configuration of the database search system 131 according to the fourth example embodiment of the present invention. FIG. 8 is a flowchart illustrating a process flow in the database search system 131 according to the fourth example embodiment.

The database search system 131 according to the fourth example embodiment includes a criteria generation device 101, a first processing unit 122, a second processing unit 132, a database 124 and a conversion unit 133.

The database 124 may be DB that uses searchable encryption such as the order-preserving encryption. In this case, the types of search instructions with which the database 124 can make a search are limited.

For convenience of explanation, it is assumed that information to be searched for is stored in the database 124.

The criteria generation device 101 has the configuration described with reference to FIGS. 1 and 2 in the first example embodiment and receives target search criteria 201 included in a search instruction. An external device or a user may send the search instruction to the criteria generation device 101 or an application or the like running on the criteria generation device 101 may send the search instruction to the criteria generation device 101.

A criteria generation unit 102 generates third search criteria and fourth search criteria on the basis of the target search criteria 201 received by the criteria generation device 101. In the case of the target search criteria 201 illustrated in Eqn. 1, the database 124 can execute a search instruction written by using the third search criteria and cannot execute a search instruction written by using the fourth search criteria.

The first processing unit 122 sends search instructions written by using first search criteria among search instructions written by using third search criteria generated by the criteria generation unit 102 in accordance with a procedure similar to the procedure in the first example embodiment to the database 124.

The database 124 receives the search instruction and extracts information in accordance with the received search instruction. The database 124 then sends the extracted information to the second processing unit 132.

The second processing unit 132 receives the information extracted by the database 124 and extract information satisfying the target search criteria 201 on the basis of the received information by executing search instructions written by using second search criteria among the search instructions written by using the third search criteria.

For convenience of explanation, an encryption function is denoted by E and a decryption function is denoted by D. Let information to be encrypted be denoted by M, then an encrypted text can be denoted by E(M). Decrypted information D(E(M)) of the encrypted text is equivalent to M. If information is not encrypted, E and D may be identity functions.

The database 124 in the following description may or may not be an encrypted DB. For convenience of explanation, the following description is made by using the encryption function E and decryption function D even in the case where the database 124 is not encrypted.

The conversion unit 133 generates an encrypted text E(M) for information M to be stored in the database 124 and sends the encrypted text E(M) to the database 124.

The database 124 receives the encrypted text E(M) and stores the received encrypted text E(M).

Search instructions received by the database 124 are search instructions encrypted in accordance with the encryption function E.

It is further assumed that the criteria generation device 101 receives search criteria R written in Eqn. 11.

$$W(P_1, \ldots, P_n, Q_1, \ldots, Q_m) \quad \text{(Eqn. 11)},$$

where $P_1, \ldots, P_n$ are possible search criteria for database 124 (i.e. the first search criteria). $Q_1, \ldots, Q_m$ represent impossible search criteria for the database 124 (i.e. the second search criteria).

It is also assumed that a search instruction written by using the search criteria R is an instruction to "extract all pieces of information satisfying R".

Further, for convenience of explanation, it is assumed that a function G written in Eqn. 12 is defined.

$$G(T,P) = P, G(F,P) = \neg P \quad \text{(Eqn. 12)}$$

where P represents search criteria.

A process in the database search system 131 according to the present example embodiment will be described using the example given above.

The criteria generation unit 102 (illustrated in FIG. 1) in the criteria generation device 101 receives search criteria written in Eqn. 11. The criteria generation unit 102 then initializes a storage unit (not depicted) where the search criteria can be stored.

Then the criteria generation unit 102 stores information indicating whether or not criteria included in first search criteria are satisfied (for example T, F) into a storage area where the criteria can be stored.

While the information for each of the criteria included in the first search criteria is stored in this example, information does not necessarily need to be stored for all criteria.

When search criteria written in Eqn. 11 are input, the criteria generation unit 102 stores information for each of the criteria included in the first search criteria and generates search criteria written in Eqn. 13.

$$G(B_1,P_1) \wedge \ldots \wedge G(B_n,P_n) \wedge W(B_1, \ldots B_n, Q_1, \ldots, Q_m) \quad \text{(Eqn. 13)},$$

where $B_i$ ($1 \leq i \leq n$) represents "T" or "F".

The criteria generation unit 102 may generate search criteria written in Eqn. 13 for all combinations of truth values that can be set for each of criteria.

The criteria generation unit 102 then determines whether or not the search criteria (Eqn. 13) are inconsistent by performing operations regarding the search criteria for which truth values are set (in this case, $W(B_1, \ldots, B_n, Q_1, \ldots, Q_m)$). In other words, the criteria generation unit 102 determines whether or not the search criteria are inconsistent as described above by performing operations for search criteria for which truth values are set. Further, when search criteria for which truth values are set result in a value of false regardless of criteria included in the second search criteria, the criteria generation unit 102 determines that the search criteria are inconsistent.

The criteria generation unit 102 may store search criteria (Eqn. 13, in this case) determined not to be inconsistent into the storage unit.

The process described above represents a process for the criteria generation unit 102 to obtain search criteria that are equivalent to search criteria R on the basis of the search criteria R. In other word, the criteria generation unit 102 calculates truth values that can be set for criteria included in the first search criteria and sets the calculated truth values in the criteria to obtain search criteria written in Eqn. 13. The criteria generation unit 102 then determines whether or not the search criteria (in this case, $W(B_1, \ldots, B_n, Q_1, \ldots, Q_m)$) where the truth values are set are inconsistent. Then, for the search criteria (in this case Eqn. 13) including search criteria determined not to be inconsistent, the criteria generation unit 102 combines the search criteria via a logical OR operator to obtain search criteria equivalent to the search criteria R.

Then the first processing unit 122 sends search instructions written by using the generated search criteria to the database 124.

For example, if a search criterion is "greater than 10" and a set truth value is "T", the first processing unit 122 sends a search instruction to "extract all values that are greater than 10" to the database 124. If a search criterion is "greater than 10" and a set truth value is "F", the first processing unit 122 sends a search instruction to "extract all values less than or equal to 10" to the database 124.

As illustrated in Eqn. 11, the search criteria $P_1, \ldots, P_n$ are possible search criteria for the database 124. Accordingly, the first processing unit 122 sends search instructions made up of search criteria written by using the search criteria $P_1, \ldots, P_n$ (Eqn. 14) among the search criteria (Eqn. 13) included in the received search instruction to the database 124.

$$G(B_1, P_1) \wedge \ldots \wedge G(B_n, \ldots P_n) \quad \text{(Eqn. 14)}$$

The search criteria illustrated in Eqn. 14 includes only the first search criteria. In other words, the database 124 can extract information in accordance with the search instruction written by using the search criteria written in Eqn. 14.

The database 124 receives the search instruction, extracts information in accordance with the received search instruction, and sends the extracted first information to the conversion unit 133.

For convenience of explanation, the information extracted by the database 124 in accordance with the search instruction described above is represented as "Ans($B_1, \ldots, B_n$)".

The conversion unit 133 receives the first information extracted by the database 124. The conversion unit 133 decrypts the received first information (step S131). In other word, the conversion unit 133 decrypts the received information by computing D(M) for each piece of the information M included in Ans($B_1, \ldots, B_n$). The conversion unit 133 then sends the decrypted information to the second processing unit 132.

Then the second processing unit 132 receives the information and extracts information in accordance with the search instruction written by using the search criteria written in Eqn. 13 to extract information satisfying the search criteria R among information included in the decrypted information (step S132). If the criteria generation unit 102 generates search criteria written in Eqn. 13 for all combinations of truth values that can be set for each criterion, the second processing unit 132 extracts information satisfying the search criteria R for the combinations. In this case, the second processing unit 132 extracts information (denoted by "J($B_1, \ldots, B_n$)") according to the search instruction written by using the search criteria written in Eqn. 13 for all of the combinations.

Because a search instruction written by using the search criteria written in Eqn. 13 includes the second search criteria $Q_1$ to $Q_m$, the database 124 cannot execute the search instruction. On the other hand, a search instruction written by using the search criteria written in Eqn. 14 includes only the first search criteria and therefore the database 124 can execute the search instruction. The criteria generation unit 102 generates possible search criteria for the database 124 (Eqn. 14, i.e. third search criteria) and impossible search criteria for the database 124 (Eqn. 13, i.e. fourth search criteria) on the basis of the search criteria written in Eqn. 11.

Further, the first processing unit 122 may send search instructions, which are written by using each of the first search criteria included in search criteria, and truth values set for the first search criteria to the database 124. In this case, the database 124 receives the search instructions written by using each of the first search criteria and the truth values set for the first search criteria. The database 124 performs operations for the first search criteria included in the search instruction on the basis of the received truth values by using logical AND operators to generate search criteria according to a formula (for example Eqn. 14) described above. The database 124 then extracts information in accordance with a search instruction written by using the generated search criteria.

In summary, the first processing unit 122 sends search instructions represented by criteria $P_i$ (where $1 \leq i \leq n$) and also sends values represented by ($B_1, \ldots, B_n$) to the database 124. Then the database 124 receives these pieces of information and generates search criteria according to Eqn. 14 on the basis of the received pieces of information.

When the database 124 generates the search criteria and then sequentially performs processing for a set of truth values set by the first processing unit 122, the first processing unit 122 does not need to repeatedly send first search criteria to the database 124. Accordingly, the amount of information sent by the first processing unit 122 to the database 124 is reduced when the database 124 generates the search criteria.

The database search system 131 may extract information through storing sets of truth values that can be set one by one in search criteria written in Eqn. 11. Alternatively, the database search system 131 may calculate all sets of truth values that can be set, calculate the logical OR of the calculated sets, and send search instructions written by using the calculated logical OR to the database 124.

Advantageous effects of the database search system 131 according to the fourth example embodiment will be described below.

The database search system 131 according to the present example embodiment has the advantageous effects of enabling more detailed search in addition to the advantageous effects of the database search system 121 according to the third example embodiment.

This is for the following reasons:
(Reason 1) The configuration of the database search system 131 according to the fourth example embodiment includes the configuration of the database search system 121 according to the third example embodiment.
(Reason 2) The database search system 131 extracts information in accordance with the processing illustrated in Eqn. 11 to Eqn. 14. The processing illustrated in Eqn. 11 to Eqn. 14 is broader than the processing illustrated in third example embodiment. Accordingly, the database search system 131 enables more detailed search.

(Hardware Configuration Example)

A configuration example of hardware resources that realize a criteria generation device in the above-described example embodiments of the present invention using a single calculation processing apparatus (an information processing apparatus or a computer) will be described. However, the availability analysis device may be realized using physically or functionally at least two calculation processing apparatuses. Further, the criteria generation device may be realized as a dedicated apparatus.

Figure 9:
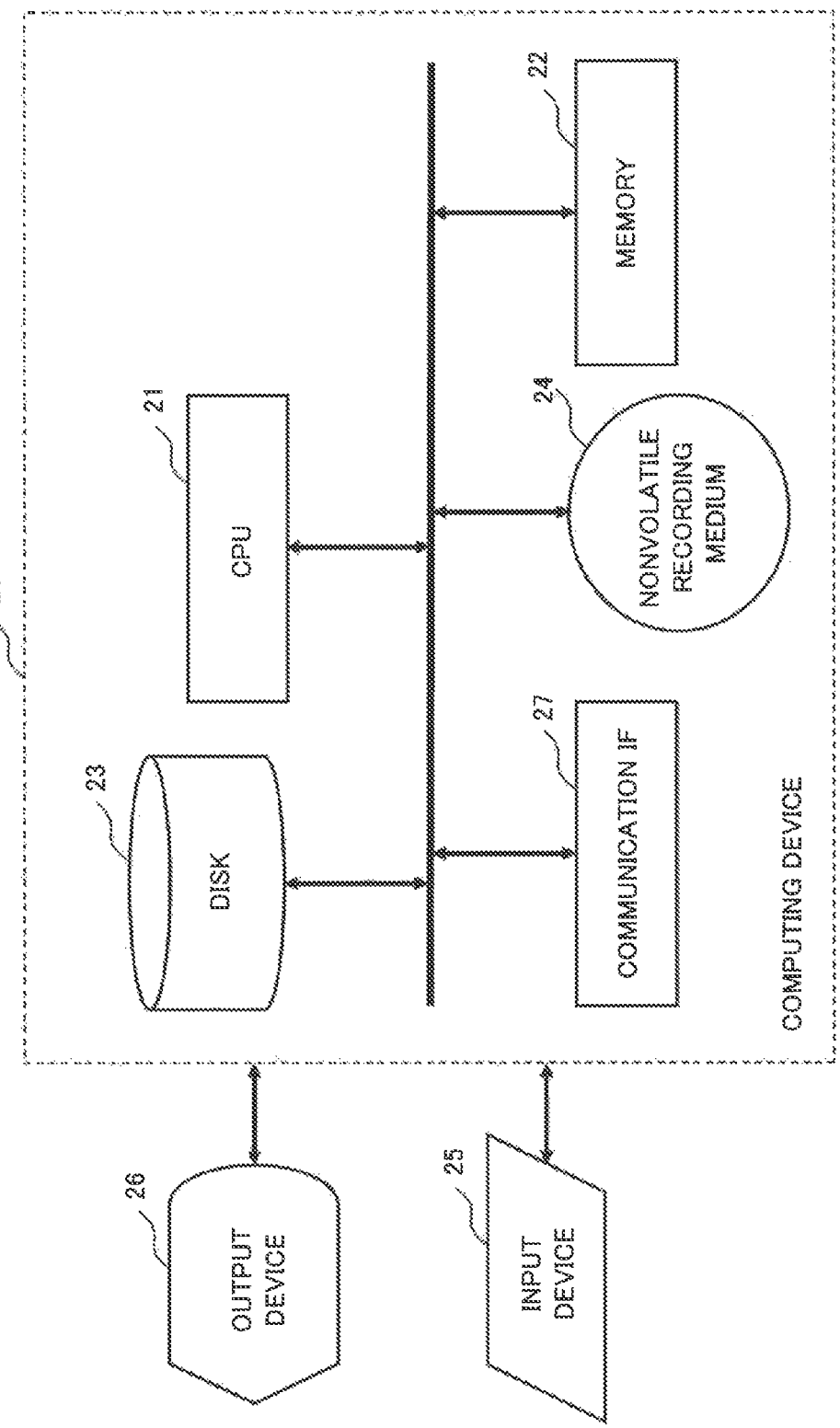
FIG. 9 is a block diagram schematically illustrating a hardware configuration of a calculation processing apparatus capable of realizing a criteria generation device or a database search system according to each of example embodiments of the present invention.

FIG. 9 is a block diagram schematically illustrating a hardware configuration of a calculation processing apparatus capable of realizing the criteria generation device according to each of the first to two example embodiments and the database search system according to each of the third and fourth example embodiments. A calculation processing apparatus 20 includes a central processing unit (CPU) 21, a memory 22, a disc 23, a non-transitory recording medium 24, and a communication interface (hereinafter, expressed as a "communication I/F") 27. A calculation processing apparatus 20 further includes an input apparatus 25 and an output apparatus 26. The calculation processing apparatus 20 can execute transmission/reception of information to/from another calculation processing apparatus and a communication apparatus via the communication I/F 27.

The non-transitory recording medium 24 is, for example, a computer-readable Compact Disc, Digital Versatile Disc, Universal Serial Bus (USB) memory, or Solid State Drive. The non-transitory recording medium 24 allows a related program to be holdable and portable without power supply. The non-transitory recording medium 24 is not limited to the above-described media. Further, a related program can be carried via a communication network by way of the communication I/F 27 instead of the non-transitory medium 24.

In other words, the CPU 21 copies, on the memory 22, a software program (a computer program: hereinafter, referred to simply as a "program") stored by the disc 23 when executing the program and executes arithmetic processing. The CPU 21 reads data necessary for program execution from the memory 22. When display is needed, the CPU 21 displays an output result on the output apparatus 26. When a program is input from the outside, the CPU 21 reads the program from the input apparatus 25. The CPU 21 interprets and executes an criteria generation program (FIG. 2, or FIG. 4) or a database search program (FIG. 6, or FIG. 8) present on the memory 22 corresponding to a function (processing) indicated by each unit illustrated in FIG. 1, FIG. 3 FIG. 5, or FIG. 7 described above. The CPU 21 sequentially executes the processing described in each example embodiment of the present invention.

In other words, in such a case, it is conceivable that the present invention can also be made using the criteria generation program or the database search program. Further, it is conceivable that the present invention can also be made using a computer-readable, non-transitory recording medium storing the criteria generation program or the database search program.

The present invention has been described using the above-described example embodiments as example cases. However, the present invention is not limited to the above-described example embodiments. In other words, the present invention is applicable with various aspects that can be understood by those skilled in the art without departing from the scope of the present invention.

This application is based upon and claims the benefit of priority from Japanese patent application No. 2014-122962, filed on Jun. 16, 2014, the disclosure of which is incorporated herein in its entirety.

REFERENCE SIGNS LIST

101 Criteria generation device
102 Criteria generation unit
151 Database
201 Target search criteria
202 Third search criteria
203 Fourth search criteria
111 Criteria generation device
112 Criteria generation unit
121 Database search system
122 First processing unit
123 Second processing unit
124 Database
131 Database search system
132 Second processing unit
133 Conversion unit
20 Computing device
21 CPU
22 Memory
23 Disk
24 Non-volatile recording medium
25 Input device
26 Output device
27 Communication IF

The invention claimed is:

1. A database search system comprising:
a memory storing instructions; and
a processor connected to the memory and configured to execute the instructions to:
   read a target search instruction including a plurality of criterion, the target search instruction being for retrieving information from an encrypted database;
   classify the plurality of criterion into possible search criteria for the database and impossible search criteria incapable of directly searching the encrypted database;
   generate a plurality of subset search criteria by:
      calculating, regarding the target search instruction, truth values indicating whether or not each of the plurality of subset search criteria, which are subsets of the possible search criteria, are satisfied, the plurality of subset search criteria being smaller than the possible search criteria; and
      setting the calculated truth values for the plurality of subset search criteria;
   determine whether or not each of the plurality of subset search criteria is inconsistent based on whether criteria of the plurality of subset search criteria is unsatisfied;
   generate third search criteria using a first subset search criteria, among the plurality of subset search criteria, determined not to be inconsistent, the possible search criteria, and the impossible search criteria;
   obtain first information extracted from the database in accordance with a search instruction written by using the possible search criteria included in the third search criteria; and
   extract values satisfying the third search criteria among a value included in the first information by executing a search instruction written by using the impossible search criteria included in the third search criteria,
   wherein a second subset search criteria, among the plurality of subset search criteria, that is determined to be inconsistent is not executed as a search instruction.

2. The database search system according to claim 1, wherein
the processor, in calculating the third search criteria, generates the third search criteria by determining whether or not result of the target search criteria, that includes the possible search criteria where the truth values are set, is determined regardless of truth values for the impossible search criteria.

3. The database search system according to claim 1, wherein,
the processor, in calculating the third search criteria, calculates, as the truth values, a value of true, that represents that the plurality of subset search criteria is satisfied, and a value of false, that represents that the subset is not satisfied,
sets the calculated value of true for the plurality of subset search criteria and determine whether or not the target search criteria are satisfied, and
sets the calculated value of false for the plurality of subset search criteria, and determines whether or not the target search criteria are satisfied.

4. A database search method executed by a computing device including a memory, the method comprising:
reading a target search instruction including a plurality of criterion, the search instruction being for retrieving information from an encrypted database;

classifying the plurality of criterion into possible search criteria for the database and impossible search criteria incapable of directly searching the encrypted database;

generate a plurality of subset search criteria by:
calculating, regarding the target search instruction, truth values indicating whether or not each of the plurality of subset search criteria, which are subsets of the possible search criteria are satisfied, the plurality of subset search criteria being smaller than the possible search criteria; and setting the calculated truth values for the plurality of subset search criteria;

determining whether or not each of the plurality of subset search criteria is inconsistent based on whether criteria of the plurality of subset search criteria is unsatisfied;

generating third search criteria with using a first subset search criteria, among the plurality of subset search criteria, determined not to be inconsistent, the possible search criteria, and the impossible search criteria;

obtaining first information extracted from the database in accordance with a search instruction written by using the possible search criteria included in the third search criteria; and extracting values satisfying the third search criteria among a value included in the first information by executing a search instruction written by using the impossible search criteria included in the third search criteria, wherein a second subset search criteria, among the plurality of subset search criteria, that is determined to be inconsistent is not executed as a search instruction.

5. A non-transitory recording medium that stores a database search program that causes a computer including a memory to implement:

a target search instruction including a plurality of criterion, the search instruction being for retrieving information from an encrypted database;

classify the plurality of criterion into possible search criteria for the database and impossible search criteria incapable of directly searching the encrypted database;

generate a plurality of subset search criteria by:
calculating, regarding the target search instruction, truth values indicating whether or not each of the plurality of subset search criteria, which are subsets of the possible search criteria, are satisfied, the plurality of subset search criteria being smaller than the possible search criteria; and setting the calculated truth values for the plurality of subset search criteria;

determine whether or not each of the plurality of subset search criteria is inconsistent based on whether criteria of the plurality of subset search criteria is unsatisfied;

generate third search criteria using a first subset search criteria, among the plurality of subset search criteria, determined not to be inconsistent, the possible search criteria, and the impossible search criteria;

obtain first information extracted from the database in accordance with a search instruct ion written by using the possible search criteria included in the third search criteria; and extract values satisfying the third search criteria among a value included in the first information by executing a search instruction written by using the impossible search criteria included in the third search criteria, wherein a second subset search criteria, among the plurality of subset search criteria, that is determined to be inconsistent is not executed as a search instruction.

6. The non-transitory recording medium that stores the database search program according to claim 5, wherein the functions configured to generate the third search criteria by determining whether or not result of the target search criteria, that includes the possible search criteria where the truth values are set, is determined regardless of truth values for the impossible search criteria.

7. The non-transitory recording medium that stores the database search program according to claim 6, wherein the functions configured to:
calculate, as the truth values, a value of true, that represents that the plurality of subset search criteria is satisfied, and a value of false, that represents that the subset is not satisfied, set the calculated value of true for the plurality of subset search criteria and determine whether or not the target search criteria are satisfied, and;

set the calculated value of false for the plurality of subset search criteria and determine whether or not the target search criteria are satisfied.

* * * * *